Dec. 4, 1928.
H. L. KRAEFT
1,694,183
JUVENILE VEHICLE
Filed Jan. 8, 1927    4 Sheets-Sheet 2
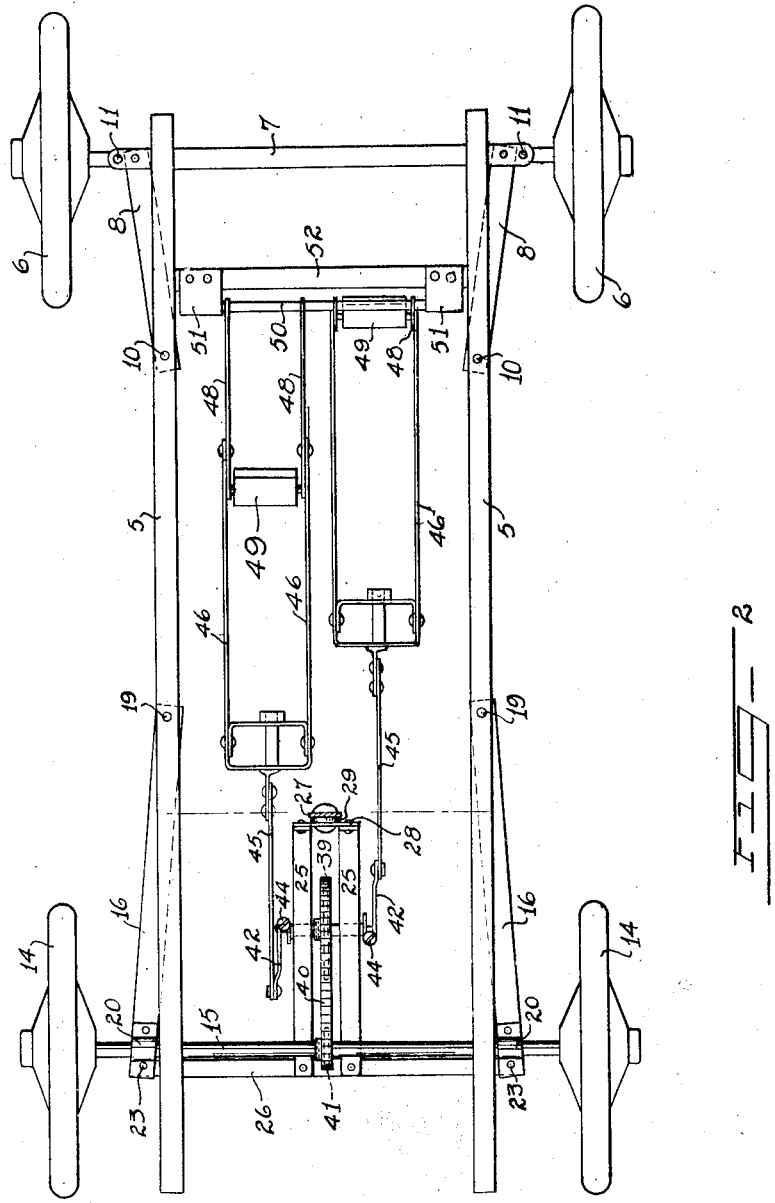
Inventor
Herman L. Kraeft
By Bates, Macklin, Gobrick & Teare
Attorneys Dec. 4, 1928.  1,694,183
H. L. KRAEFT
JUVENILE VEHICLE
Filed Jan. 8, 1927   4 Sheets-Sheet 3
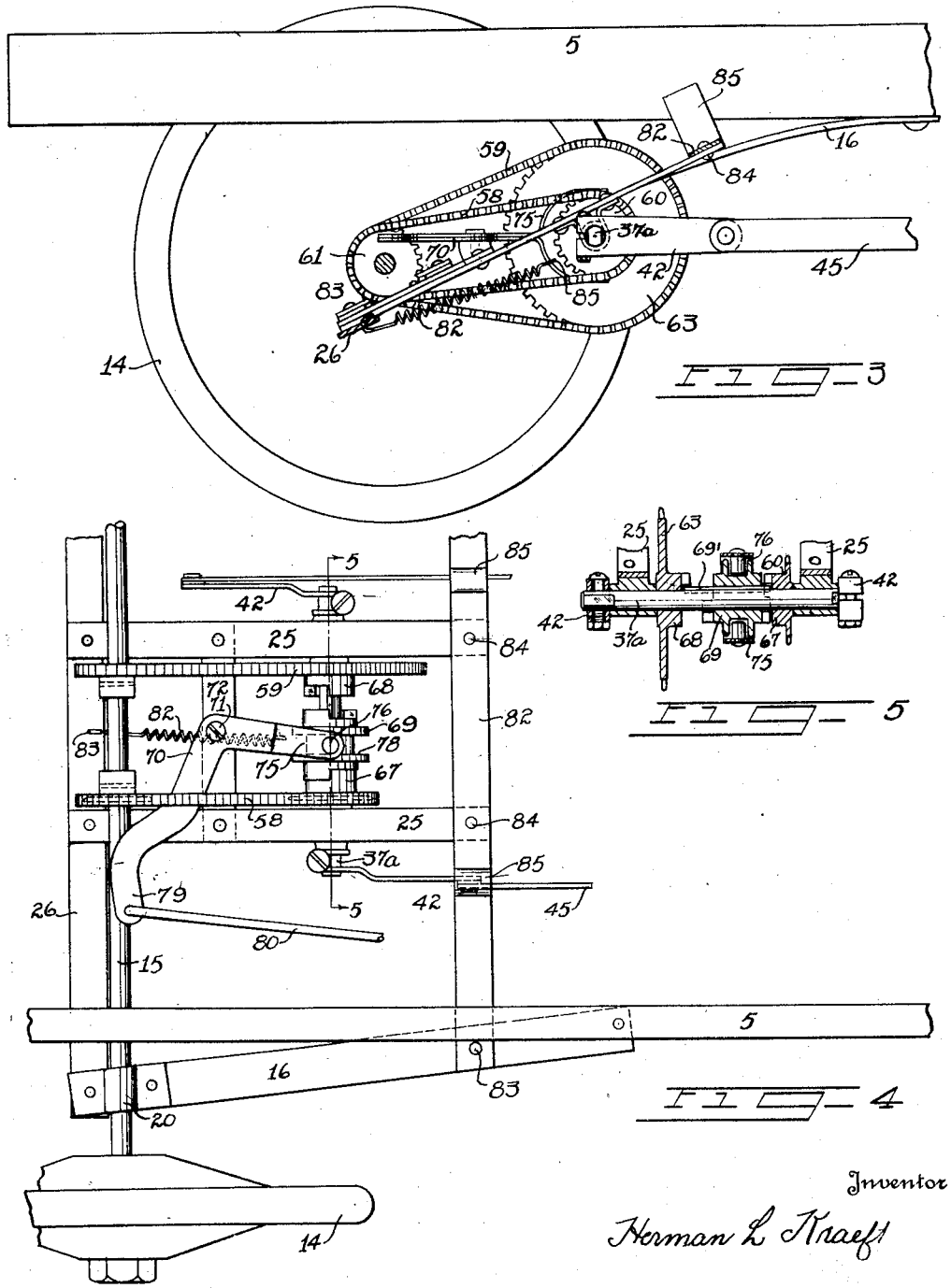

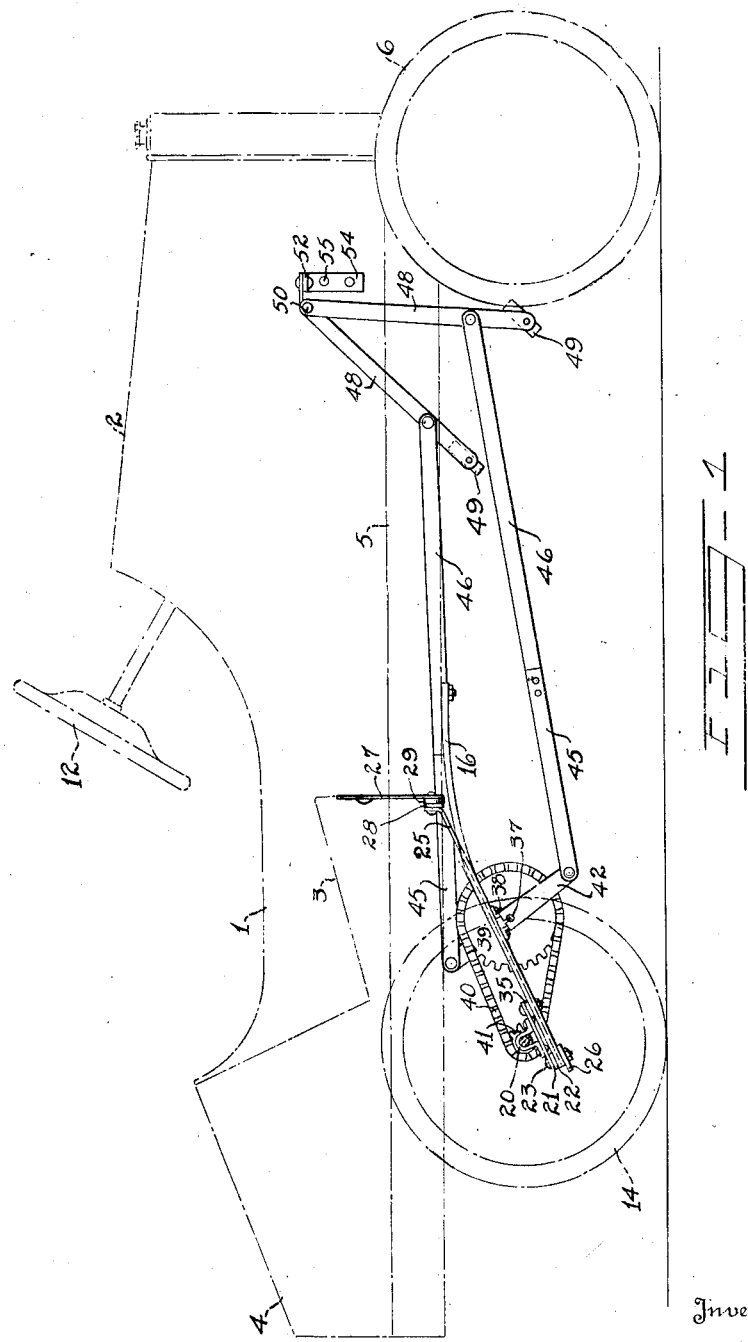

Dec. 4, 1928. 1,694,183
H. L. KRAEFT
JUVENILE VEHICLE
Filed Jan. 8, 1927   4 Sheets-Sheet 4
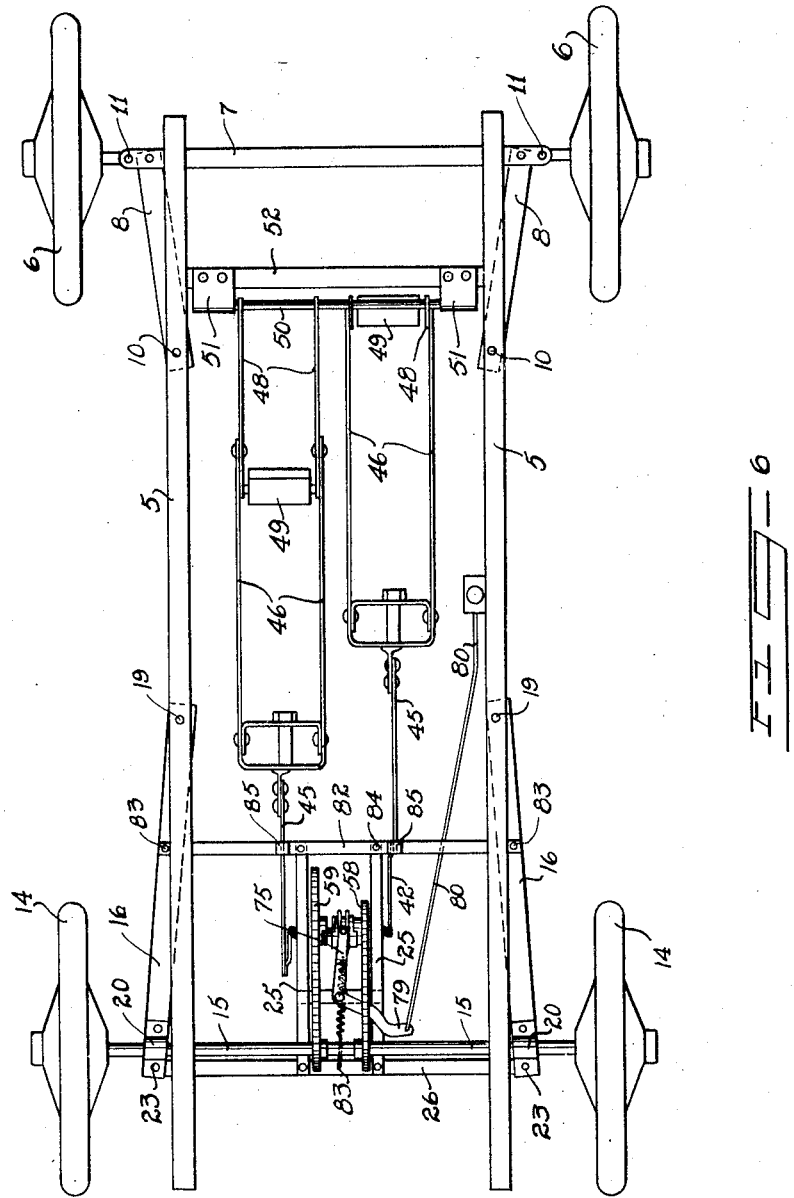
Inventor
Herman L. Kraeft
By Bates, Macklin, Golrick & Teare
Attorneys Patented Dec. 4, 1928.

1,694,183

UNITED STATES PATENT OFFICE.

HERMAN L. KRAEFT, OF CLEVELAND, OHIO, ASSIGNOR TO MURRAY OHIO MANUFACTURING COMPANY, OF CLEVELAND, OHIO, A CORPORATION OF OHIO.

JUVENILE VEHICLE.

Application filed January 8, 1927. Serial No. 159,794.

This invention relates to toy vehicles, particularly to a child's automobile of the type wherein there is pedal or manually operated mechanism connected with one or more of the driving wheels for propelling the vehicle. An object of the invention is to provide such a child's vehicle with a simple, cheap and durable propelling mechanism and support therefor. A further object is to provide a child's vehicle, in which one set of wheels including the traction wheel has a floating connection with the vehicle body and driven by a simple over-drive gearing which will operate efficiently, irrespective of the floating movement of such wheels.

Further objects include the provision of a child's vehicle with a convenient and simple change speed gearing.

Other objects and features of the invention will become apparent from the following description relating to the accompanying drawings, wherein I have shown my preferred form. The essential novel characteristics are summarized in the claims.

Briefly, the toy as shown consists of a body including suitable frame work or bracing members, the driving axle having a floating connection with the body by reason of leaf springs anchored at one end to the body or frame. This driving axle consists of a straight shaft mounted on the free ends of the leaf springs. The over-drive gearing includes a pair of sprocket wheels and a chain, one sprocket wheel being rigid with the axle, the other being mounted on a jack shaft parallel to the axle and having bearings supported by torque members forming part of a frame which is mounted to move up and down with the springs. The jack shaft has crank arms connected by suitable linkage to depending pedal levers pivotally supported by the body or frame.

Suitable steering mechanism may be arranged to act on the front wheels in the manner of a full sized automobile. Such steering mechanism is not shown herein in detail but reference may be had to my copending application Serial No. 177,508, filed March 23, 1927.

In the drawings Fig. 1 is a side elevation; Fig. 2 is a corresponding plan view; Fig. 3 is a fragmentary side elevation showing a two speed change gearing; Fig. 4 is a plan corresponding to Fig. 3, Fig. 5 is a sectional detail as indicated by the lines 5—5 on Fig. 4, and Fig. 6 is a plan view showing the two-speed gear and its relation to the entire chassis.

Referring in detail to the drawings and first to Figs. 1 and 2, 1 indicates a suitable body shown in broken lines and having the usual hood 2, passenger compartment including the seat 3 and rear body portion 4, the body being adapted to be mounted on a pair of longitudinally extending frame members shown in Fig. 2 at 5. Other bracing members not shown in detail may be arranged to lend further rigidity to the body.

A front axle is indicated at 7 supported at the free ends of leaf springs 8 anchored to the frame members 5 as at 10. The front wheels 6 may be pivotally supported at 11 on the ends of the axle 7, and any suitable connections may be made from the wheel supports to a steering gear 12.

At least one of the rear wheels 14 is rigid with the rear axle 15 to provide a traction drive, and to provide a resilient floating support for the rear axle I have shown a pair of leaf springs 16 anchored at their forward ends to the frame members 5 at 19. The rear ends of springs 16 carry axle bearings which, as shown, comprise suitably formed straps or brackets 20 secured to bed plates 21, which plates rest on resilient washers 22. The plates 21 may be clamped to the rear ends of the springs by suitable bolts 23 passing through the plate, washers and springs.

For supporting the driving gearing I provide in effect a pivoted frame or bed which is free to move up and down in synchronism with the leaf springs, the frame as shown being secured to the springs at their free ends. The gearing supporting frame comprises a pair of elongated sheet metal members 25 secured at their rear ends to a cross bar 26 connecting the rear ends of the springs 16. The front ends of the members 25 are suspended from the body by a more or less flexible metal plate 27 adapted to be rigidly secured at its upper end to the body beneath the seat 3 and resiliently connected to the gearing support members 25. This resilient connection comprises a cross brace 28 rigid with the members 25 and a resilient filler 29 made from rubber or the like and interposed between the plate 27 and cross brace. By this arrangement the gearing supporting frame may have an endwise movement, which is desirable to allow the free movement of the springs about their point of anchorage, this point being considerably ahead of the anchorage for the frame members 25. It will be apparent from Fig. 1 that if, for example, the rear ends of the springs are thrust upwardly toward the body the members 25 will shift forwardly. Normally the rubber filler will absorb this movement, but if it should be excessive then the plate 27 will bend to allow further shifting movement.

It may be well to note at this point that the longitudinal distance between the effective pivotal support for the gearing supporting frame and the spring support for the axle is occasioned by the desirability of long leaf springs and a relatively short gearing support frame. The shorter the frame is, the less it will be subject to bending. Also if the gearing supporting frame is made to be anchored beneath the seat as shown no special cross frame member has to be provided for the gearing supporting frame.

The over drive gearing, as shown in Figs. 1 and 2, comprises a jack-shaft 37 secured to the members 25, as by means of straps 38, the shaft carrying a sprocket wheel 39, being connected by a chain 40 with a smaller sprocket wheel 41 rigid with the axle. The jack-shaft has crank arms 42 clamped at the ends thereof by screws 44. This clamping device is shown in my co-pending application Serial No. 166,079, filed February 5, 1927. The free ends of the arms are shown, in Fig. 2, as connected by links 45, to bifurcated members 46, the forward ends of the bifurcated members being in turn connected to U-shaped levers 48 carrying suitable swiveled pedals 49. A rigid support is provided for the upper ends of the levers 48 by reason of a cross rod 50 supported at its ends in straps 51 secured to a cross frame member 52, which as shown has downwardly turned ends 54 adapted to be secured to the respective sides of the body. In operation, the child reciprocates the levers 46 by means of the pedals, the bifurcated arrangement of the levers providing sufficient room for the child's feet. This reciprocating motion is imparted to the crank shaft 37, which in turn, through the driving gearing 39—40—41 drives the rear axle.

Referring to Figs. 3 to 6, in which the parts corresponding to the form shown in Figs. 1 and 2 are similarly numbered to avoid repetition, I have shown the members 25 spaced wider apart to accommodate two sprocket mechanisms, including chains 58 and 59, arranged to be operated selectively. The sprocket 60 on the jack shaft 37ᵃ is the same size as the corresponding sprocket 61 rigid with the axle 15, while the sprocket 63 on the jack shaft is shown as larger than the corresponding sprocket 64 on the axle. This provides in effect direct as well as overdrive. Both the sprockets 60 and 63 are loose on the jack shaft and each has a clutch member 67 and 68 respectively, engageable by a sliding clutch sleeve 69 splined to the jack shaft as at 69'. A suitable gearing control comprises, as shown, a bell crank 70 having a bifurcated end 75 with pins 76 engaging the usual groove 78 in the clutch sleeve. The laterally extending arm 79 projects through the upper and lower stretches of the sprocket chain and may be operated by a rod 80 extending to a suitable lever or the like within reach of the child.

For holding the clutch sleeve in its two positions I show a tension spring 82 anchored at its rear end at 83 to the cross member 26, and at its forward end as at 85 to the shipper arm beyond its pivot. By reason of such connection the spring swings from one side of the pivot to the other and will obviously tend to hold the clutch in whichever position it is manually forced. As shown in Fig. 5, the spring is holding the clutch in position to render the direct drive sprocket connection 58—60—61 active. The over-drive is obtained when the clutch sleeve is in its other position connecting the jack shaft to the sprocket wheel 63.

Figs. 3, 4 and 6, by way of further modification, show a different suspension for the gearing supporting frame. In this case the gearing supporting frame has no connection with the body other than through the leaf springs 16. To this end a cross bar 82 is connected as at 83 with the leaf springs 16. The elongated members 25 of the gearing supporting frame are shown as secured to the cross bar intermediate of its ends as at 84. The cross bar 82 has two upwardly bent portions 85 which serve to clear the arms 42 and links 45 when these members are rotated and reciprocated to drive the gearing. The upwardly bent portions also serve to add lateral resiliency to the member 82, wherefore it may give when one end of the axle is lowered with reference to the other end as when one wheel rides over a bump.

From the above description it will be seen that I have provided a very simple overdrive mechanism adaptable to a floating axle suspension, yet which will not interfere with the free operation of the suspension in relieving shock to the child's body. Since the axes of the gears (the sprocket wheels) are maintained at a constant distance from each other by reason of both coacting gears being unitarily mounted on the floating frame the mechanism will run easily for a great length of time without need of repair. Moreover, although the mechanism as a whole may be cheaply manufactured from inexpensive materials, by reason of the arrangement shown, the toy has been found to endure the usual rough treatment an article of this character generally meets with.

While I have referred to the gearing as an over-drive, I do not propose to be limited in carrying out my invention to any specific gear relation, and while I have pointed out the particular advantages of certain details I do not wish to be limited to such details in the use of the invention as a complete mechanism.

I claim:

1. A child's vehicle comprising a frame, front and rear wheels therefor, two of the wheels having a resilient floating connection with the frame, driving mechanism for one of the floating wheels comprising a crank shaft operatively connected to such wheel and having a resilient floating connection with the frame and pedal lever mechanism with connections for rotating the shaft.

2. In a child's vehicle, a frame, an axle, and a crank shaft, the axle and shaft having a common resilient floating connection with the frame, an operating connection between the shaft and axle, means for turning the shaft, and a traction wheel rigid with the axle.

3. In a child's vehicle, a frame, an axle and a crank shaft having a common resilient floating connection with the frame, the crank shaft being parallel to the axle and operatively connected thereto, reciprocating means for turning the shaft, and a traction wheel rigid with the axle.

4. In a child's vehicle, a frame, an axle and a crank shaft, each having a resilient floating connection with the frame, the crank shaft being parallel to the axle and having a geared connection therewith, pedal operated means for turning the shaft, and a traction wheel rigid with the axle.

5. In a child's vehicle, a frame, an axle having a resilient floating connection with the frame, a crank shaft, said shaft being parallel to the axle and partially supported by said resilient floating connection, means operatively connecting the shaft with the axle, a traction wheel rigid with the axle, and reciprocating means adapted to be operated by the child and supported by the frame for imparting rotation to the crank shaft.

6. In a child's vehicle, a frame, an axle having a floating connection with the frame, a crank shaft parallel with the axle and having a similar floating connection with the frame, means operatively connecting the crank shaft with the axle for relative rotation, a traction wheel on the axle, and pedal operated means connected with an arm of the crank shaft for rotating the shaft.

7. In a child's vehicle, a frame, an axle having a resilient floating connection with the frame, a crank shaft parallel with the axle and having a floating connection with the frame, said latter connection affording movement of the shaft parallel to the movement of the axle whereby the distance between the axes of the shaft and axle is substantially constant, gear means connecting the crank shaft with the axle, a traction wheel on the axle, and reciprocating means adapted to be operated by the child for turning the crank shaft.

8. In a child's vehicle, a frame, an axle having a resilient floating connection with the frame, a crank shaft parallel with the axle and having a substantially parallel floating connection with the frame, means connecting the crank shaft with the axle, a traction wheel on the axle, crank arms carried at the ends of the crank shaft, a pair of depending levers carried by the frame and adapted to be operated by the child, and links connecting the levers with the crank arms.

9. In a child's vehicle, a frame, an axle, a plurality of elongated sheet metal members connecting the axle with the frame, a crank shaft carried by at least one of said members and having a sprocket connection with the axle, and reciprocating means connected with the crank and adapted to be operated by the child.

10. In a child's vehicle, a frame, an axle, a plurality of elongated sheet metal members connecting the axle with the frame, a crank shaft supported by two of said members and having a sprocket connection with the axle, crank arms carried by the shaft, and reciprocating means connected with the crank arms and adapted to be operated by the child.

11. In a child's vehicle, a frame, an axle, means for connecting the axle with the frame, said means allowing the axle to float relative to such frame, a shaft parallel to the axle, a pair of elongated members anchored to the frame at one end and freely movable in synchronism with the axle at the other, a driving connection between the shaft and the axle, and reciprocating means adapted to be operated by the child and having a driving connection with the shaft to turn it.

12. In a child's vehicle, a frame, an axle, a plurality of elongated sheet metal members connecting the axle with the frame and allowing the axle to float relative to such frame, a shaft, elongated sheet metal members for supporting the shaft, each being anchored at one end thereof to the frame, means for connecting the shaft to the axle, and reciprocating means adapted to be operated by the child and having an operating connection with the shaft to turn it.

13. In a child's vehicle, a frame, a driving axle and a shaft parallel therewith, both the shaft and axle having a floating connection with the frame, a sprocket connection between the shaft and axle, a crank arm carried by the shaft, a link attached to the extremity of the crank arm, and an oscillating pedal connected to the link.

14. In a child's vehicle, a frame, a driving axle and a shaft parallel therewith, both the shaft and axle having a floating connection with the frame, a sprocket connection between the shaft and axle whereby the axle rotates at a different speed from the shaft, a crank arm rigid with the shaft, a link attached to the extremity of the crank arm and a lever adapted to be operated by the child, said lever being pivotally mounted on the frame and connected to the link.

15. In a child's vehicle, a body, a traction wheel, a driving shaft therefor remote from the axis of the wheel but parallel thereto, a driving connection between the shaft and wheel, a common floating support for both the wheel and shaft, said support being secured to the body, and means remote from the shaft adapted to be operated by the child and having a connection with the shaft for turning it.

16. In a child's vehicle, a body, a traction wheel, a driving shaft therefor positioned forwardly of the axis of the wheel but parallel thereto, a flexible driving connection between the shaft and wheel, a common floating support for both the wheel and shaft, said support being secured to the body, and pedal operated means remote from the shaft and having a connection with the shaft for turning it.

17. In combination with a child's vehicle having a frame and wheels, a lever having its pivot rigid with the frame, the lever extending downwardly from the pivot, an axle for two of the wheels having a floating connection with the frame, a substantially vertically floating crank shaft drivingly connected with the axle, and linkage operatively connecting the lever to the crank shaft.

18. In a child's vehicle, a pair of substantially straight shafts having a floating connection with the vehicle body, flexible means connecting the shafts, a traction wheel drivingly rigid with one of the shafts, and reciprocating means adapted to be operated by the child and having a crank connection with the other shaft.

19. In a child's vehicle having a body and wheels, an axle drivingly rigid with one of the wheels, a shaft for driving the axle, a common support for the axle and shaft movable relative to the body, and pedal means adapted to be operated by the child and drivingly connected to the shaft.

20. In a child's vehicle, a frame, a pair of leaf springs anchored at one end to the frame, an axle supported by the free ends of the leaf springs, a shaft parallel to the axle and having a sprocket connection therewith, a frame carried at one end by the leaf springs for supporting the shaft, and reciprocating means adapted to be operated by the child and having a connection with the shaft for turning it.

21. In a child's vehicle, an axle, a driving shaft therefor having two operating connections with the axle, a common floating support for the axle and shaft, a traction wheel driven by the axle, means adapted to be operated by the child and connected with the shaft to turn it, and means for selectively causing one or the other of said driving connections to be operative at a time.

22. In a child's vehicle, an axle, a driving shaft therefor parallel thereto and having two operating connections with the axle, a traction wheel driven by the axle, a crank arm carried by the shaft, reciprocating means adapted to be operated by the child and connected with the crank arm, and means for selectively causing one or the other of said driving connections to be operative at a time and for rendering both inoperative.

23. In a child's vehicle, a body, a traction wheel and a driving shaft therefor remote from the axis of the wheel but parallel thereto, two operating connections between the shaft and wheel whereby the wheel may be driven at two speeds relative to the shaft, a floating connection between the wheel and body, reciprocating means adapted to be operated by the child and having an operating connection with the shaft for turning it, and means for selectively rendering the said two connections operative alternately.

24. In a child's vehicle, a traction wheel a driving shaft therefor remote from the axis of the wheel, but parallel thereto, two operating connections between the shaft and wheel, a crank arm connected to the shaft, and reciprocating means adapted to be operated by the child and connected with the crank arm for turning the shaft, and means for selectively rendering the said two connections operative and idle.

25. In a child's vehicle, a frame, an axle, a shaft, the axle and shaft having a common floating support connected with the frame, a pair of wheels loosely journalled on the shaft, each having a different driving connection with the axle, means splined to the shaft and movable to two positions for causing the shaft to drive either of the wheels, and means adapted to be operated by the child for turning the shaft.

26. In a child's vehicle an axle and a shaft parallel therewith, the axle and shaft having a common floating support connected with the vehicle body or frame, a pair of wheels loosely journalled on the shaft, each having a driving connection with the axle and a clutch member splined to the shaft and movable to two active positions for causing the shaft to drive either of the wheels, a crank on the shaft and reciprocating means connected to the crank and adapted to be operated by the child to turn the shaft.

27. In a child's vehicle, a frame, an axle, a shaft parallel therewith and operatively connected thereto for two relative speeds, a resilient floating support common to both the axle and shaft, said support being anchored at one end only to the frame, means for operating the shaft, adapted to be actuated by the child, and means for selectively rendering the connection between the shaft and axle operative for either speed.

28. In a child's vehicle, a frame comprising a pair of members extending longitudinally of the vehicle body, a pair of leaf springs each anchored at one end thereof to a respective frame member, an axle loosely journalled at the free ends of said springs, a second frame comprising elongated sheet metal members intermediate of the springs and anchored at one end to the first named frame and having a connection at the other with the springs, a driving gearing comprising a shaft operatively connected to the axle and supported intermediately of the ends of said elongated members, and means having a connection with the shaft and adapted to be operated by the child for turning the shaft.

29. In a vehicle of the character described, a body, a pair of leaf springs each secured to the body at one end, an axle secured to the other ends of the springs, a traction wheel rigid with the axle, a gearing comprising a shaft and means drivingly connecting the shaft with the axle, and a complete support for the shaft bridging from one spring to the other.

30. In a child's vehicle, a frame, an axle having a floating connection with the frame comprising a pair of leaf springs each secured at one end thereof to the frame, cross members connecting the leaf springs, frame members bridging from one of the cross members to the other, and a gearing comprising a shaft and means connecting the shaft to the axle, said means being supported by said frame members.

In testimony whereof, I hereunto affix my signature.

HERMAN L. KRAEFT.